(12) United States Patent
Ganesh et al.

(10) Patent No.: US 9,342,630 B2
(45) Date of Patent: May 17, 2016

(54) SYSTEM AND METHOD FOR MONITORING AND ANALYZING SOCIAL NETWORK DATABASES (71) Applicant: INFOSYS LIMITED, Bangalore (IN)

(72) Inventors: Jai Ganesh, Bangalore (IN); Gopakumar Madhuragil Gopalakrishnan, Kerala (IN); Ajay Kolhatkar, Pune (IN); Shaurabh Bharti, Bihar (IN); Shrirang Prakash Sahasrabudhe, Pune (IN); Nishtha Srivastava, Uttar Pradesh (IN); Vijaya Bhaskar Peddinti, Hyderbad (IN); Tarun Prakash Sharma, Dehradun (IN); Mukund Raj, New Delhi (IN)

(73) Assignee: Infosys Limited, Bangalore (IN)

( * ) Notice: Subject to any disclaimer, the term of this patent is extended or adjusted under 35 U.S.C. 154(b) by 61 days.

(21) Appl. No.: 13/716,045

(22) Filed: Dec. 14, 2012

(65) Prior Publication Data

US 2013/0166540 A1 Jun. 27, 2013

(30) Foreign Application Priority Data

Dec. 27, 2011 (IN) .......................... 4597/CHE/2011

(51) Int. Cl.
*G06F 17/30* (2006.01)
*G06Q 30/02* (2012.01)
*G06Q 50/00* (2012.01)

(52) U.S. Cl.
CPC .... *G06F 17/30994* (2013.01); *G06F 17/30864* (2013.01); *G06Q 30/02* (2013.01); *G06Q 50/01* (2013.01)

(58) Field of Classification Search
CPC .................... G06F 17/30861; G06F 17/30864; G06F 17/30867; G06F 17/3089; G06F 17/30997; G06F 17/30994
USPC .................. 707/722, 724, 725, 732, 733, 734
See application file for complete search history.

(56) References Cited

U.S. PATENT DOCUMENTS

| | | | | |
|---|---|---|---|---|
| 8,606,643 | B2 * | 12/2013 | Lawrence et al. | 705/26.1 |
| 8,655,938 | B1 * | 2/2014 | Smith et al. | 709/200 |
| 2007/0050393 | A1 * | 3/2007 | Vogel et al. | 707/102 |
| 2010/0121849 | A1 * | 5/2010 | Goeldi | 707/736 |
| 2011/0125793 | A1 * | 5/2011 | Erhart et al. | 707/776 |
| 2011/0246378 | A1 * | 10/2011 | Prussack et al. | 705/310 |
| 2012/0209920 | A1 * | 8/2012 | Neystadt et al. | 709/205 |
| 2013/0006882 | A1 * | 1/2013 | Galliani | 705/319 |
| 2013/0151345 | A1 * | 6/2013 | Brelig | 705/14.66 |

* cited by examiner

*Primary Examiner* — Hares Jami
(74) *Attorney, Agent, or Firm* — Marc S. Kaufman; Amardeep S. Grewal; Reed Smith LLP (57) ABSTRACT

A system and method for monitoring and analyzing social network databases to determine actual key influencers is disclosed. Inputs are received from the user, which includes search keyword(s), time, date, language, area and country. Content corresponding to the user inputs is fetched from the social network databases. The fetched content is analyzed to identify a list of probable key influencers. Among the probable key influencers, actual key influencers are determined based on parameters associated with the probable key influencer. Reports may be generated based on the actual key influencers and the content they posted on the social network.

33 Claims, 7 Drawing Sheets

SYSTEM AND METHOD FOR MONITORING AND ANALYZING SOCIAL NETWORK DATABASES

RELATED APPLICATION DATA

This application claims priority to Indian Patent Application No. 4597/CHE/2011, filed Dec. 27, 2011, which is hereby incorporated by reference in its entirety.

FIELD OF THE INVENTION

The present disclosure in general relates to monitoring and analyzing of social network databases. In particular, the invention relates to a system and method for analyzing social network databases to determine actual key influencers.

BACKGROUND OF THE INVENTION

The World Wide Web is a vast repository of information that connects people and provides access to millions of web resources via the Internet. Social Networks are growing exponentially, which presents challenges for enterprises who want to monitor and mine the data provided by these social networks. Typically a social network is a structure where people/organizations connect with each other and form a special type of relationship, for example, a blog search module which connects the blogs and social media sites with the advertisers who want to join the conversation and hence forming a social network. Additionally, social networks, both formal as well as informal can foster knowledge sharing among the participants. A participant herein refers to a person/organization who is participating in contributing content either directly or indirectly in any social network.

The exchanges that take place in social networking environments go beyond providing direct value to the participants. It fosters collaboration among them and can lead to aggregation of highly influential content and ideas within various types of social networks. There is market opportunity for organizations who can mine intelligence out of social network databases. As is known in the art, a social network database generally refers to a repository of content generated in social networking environment by the participants of such social network. Content generated in social networking environments would include discussion threads, logs of chat room conversations, contents of blogs, and any other content posted by the participants. This collection of content comes generally from original sources (creation of the participants), referenced sources (material cited and presented by the participants) and aggregated content (collection of material assembled in a unique manner). The accumulated content can be considered as an asset that has value, which can be tapped through the right types of analyses. This asset has potential value to both the participants and non-participants whose products and services being discussed in any social network.

Some of the participants have great influence on other participants and even non participants when they write/blog/cite any content in a specific domain. For example, if a world-renowned chef writes a review about a restaurant on a social network, the published content has a potential to make an impact about the restaurant on the participants/non-participants as the content has be written by a person who is influential in the field of cookery. Therefore, it may be vital for all the restaurants to keep an eye on such key influencers.

Many organizations perform Social Network Analysis (SNA) on the social media to extract information useful for their organization. Though, there is a general need to enable a person/organization to real-time monitor and analyze social network databases and determine actual key influencers. Thereby, enhance their decision making ability. Several aspects of the present disclosure provides a social network intelligence platform which monitors and analyze the social network database to enable a user(s)/organization(s) to enhance their decision making ability as described in below sections.

SUMMARY OF THE INVENTION

In one of the embodiment of the present disclosure, a system monitor and analyze information relating to a product in at least one social network database by utilizing data of multiple social network databases. This system could be hosted as a cloud service or could be a internet hosting service. The user inputs are received using a data receiving module. The inputs can be but not restricted to a search keyword relating to a product, time, date, language, area and country. A weight is assigned to the search keyword. Further, the user may also select one or more social network database among the multiple social network databases present. The content of the social network database may include content created, cited and presented by participants. The inputs accepted are validated by a validation module.

The inputs could be used by the crawler module to fetch the content from multiple databases. The intelligence rules module receives the information from the crawler module to analyze the fetched content from the social network database. The intelligence rules module may also identify a first key influencer which is a list of probable key influencers.

Further, a second key influencer which can be a list of actual key influencers could be determined by the intelligence rules module based on one or more parameters associated with the list of probable key influencers. One of the parameters considered could be the weight assigned to the search keyword. The one or more parameters may also include metadata associated with the participant's profile and activity information related to the participant.

Finally a reporting module could be configured to generate a report on the second key influencer. The report could be but not restricted to a detailed report or a summary report. The detailed report may include an analysis metrics of the selected social network databases and the summary report may include a high level summary of the social network analysis metrics of the initially selected social network database. The reporting module may also generate a social graph based on the fetched content from the selected social network database.

BRIEF DESCRIPTION OF THE DRAWINGS

These and other features, aspects, and advantages of the present disclosure will be better understood when the following detailed description is read with reference to the accompanying drawings in which like characters represent like parts throughout the drawings, wherein.

DETAILED DESCRIPTION OF THE INVENTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings. While the invention described herein is provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof.

Figure 1:
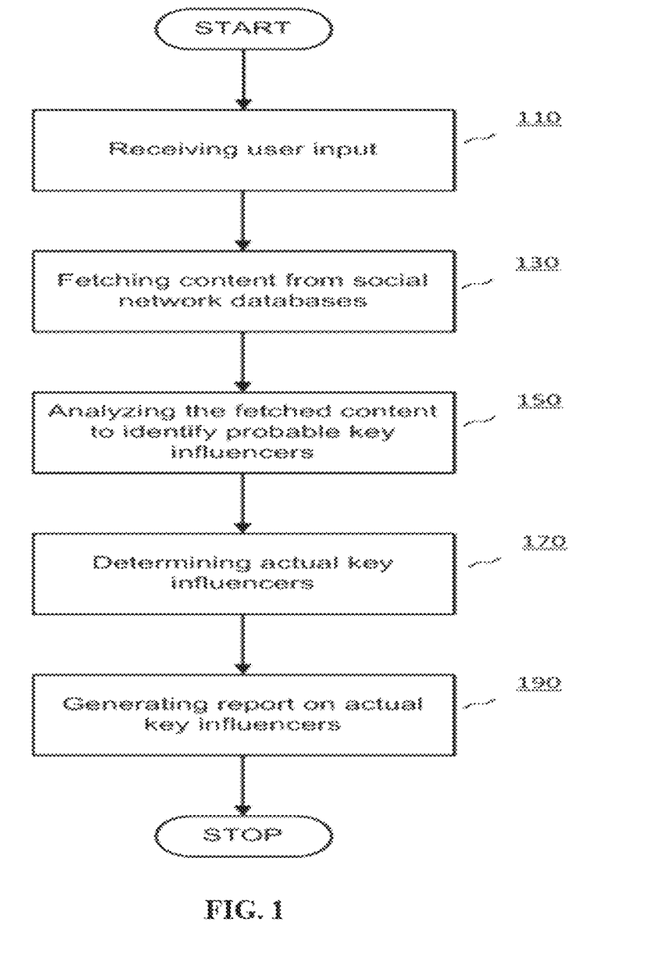
FIG. 1 is an illustrative diagram to explain the manner of monitoring and analyzing social network databases to determine actual key influencers according to an aspect of the present invention.

FIG. 1 is an illustrative diagram to explain the manner of monitoring and analyzing social network databases to determine actual key influencers according to an aspect of the present invention. The present disclosure contemplates any suitable component or device carrying out any portion of any suitable step of method of FIG. 2.

Particular embodiment determines actual key influencers after analyzing the content of the social network databases. Actual key influencer herein refers to a participant whose data/information provided in social network databases may influence/impact the decision making of a user (user herein may include a person or an organization) regarding a specific domain. The specific domain is identified based on the search keywords (the search keywords may include hash tags and key phrases) given by the user. Therefore, for example, if the user has given "mobile phone" as a keyword to search in the social network databases, the specific domain herein may refer to mobile electronic devices. Further, the user in this example may want to identify the actual key influencers who are writing/blogging/advertising in the domain of mobile electronic devices in different social network and may further want to know the content these key influencers are writing/blogging/advertising about.

Additionally, the user may provide other inputs along with the keywords (step 110). These inputs may include, but not limited to, time, date, language, area, country of the post created/posted by the participants or combinations thereof. In one embodiment, user may be enabled to select the required databases from the list of social network databases. After the user provides the inputs, the content corresponding to the user inputs is fetched from the selected social network databases (step 130). Typically the content of the social network database includes content created, cited or presented by the participants.

The fetched content is analyzed based on the factors such as repost count of a content by the other participants, number of comments posted against a content, matching keyword count in every fetched content, time at which the content is posted, and the like (step 150). The participants corresponds to the analyzed content are the probable key influencers.

Once the probable key influencers are identified, the actual key influencers are determined after evaluating parameters associated with the probable key influencers (step 170). Generally, the social network databases store metadata of the participants such as his/her profession, age, likes/dislikes etc. along with the activity information such as connections of a participant with other participants, friends count, follower count, account creation date etc. Actual key influencers are determined based on the parameters which include both metadata and activity information associated with the probable key influencers. These parameters may include, but not limited to, follower count, list count, friend count, keyword matching content, and the like.

After the actual key influencers are identified, reports can be generated which may include the details (metadata and activity information) of the key influencers and the relevant content (correspond to the keyword provided by the user) created/cited/presented by the key influencers (step 190). The detailed report may provide a social network analysis metrics of the selected social network databases. The social network analysis metrics may include, but not limited to, a list of top influencers across multiple databases. Additionally, a summary report can be generated which may provide a high level summary of the social network analysis metrics of the selected social network databases. The high level summary of the social network analysis metrics may include one or more of the details from the social network analysis metrics. The method of determining the actual key influencers in a social network database is described in an illustrative example below.

Figure 2:
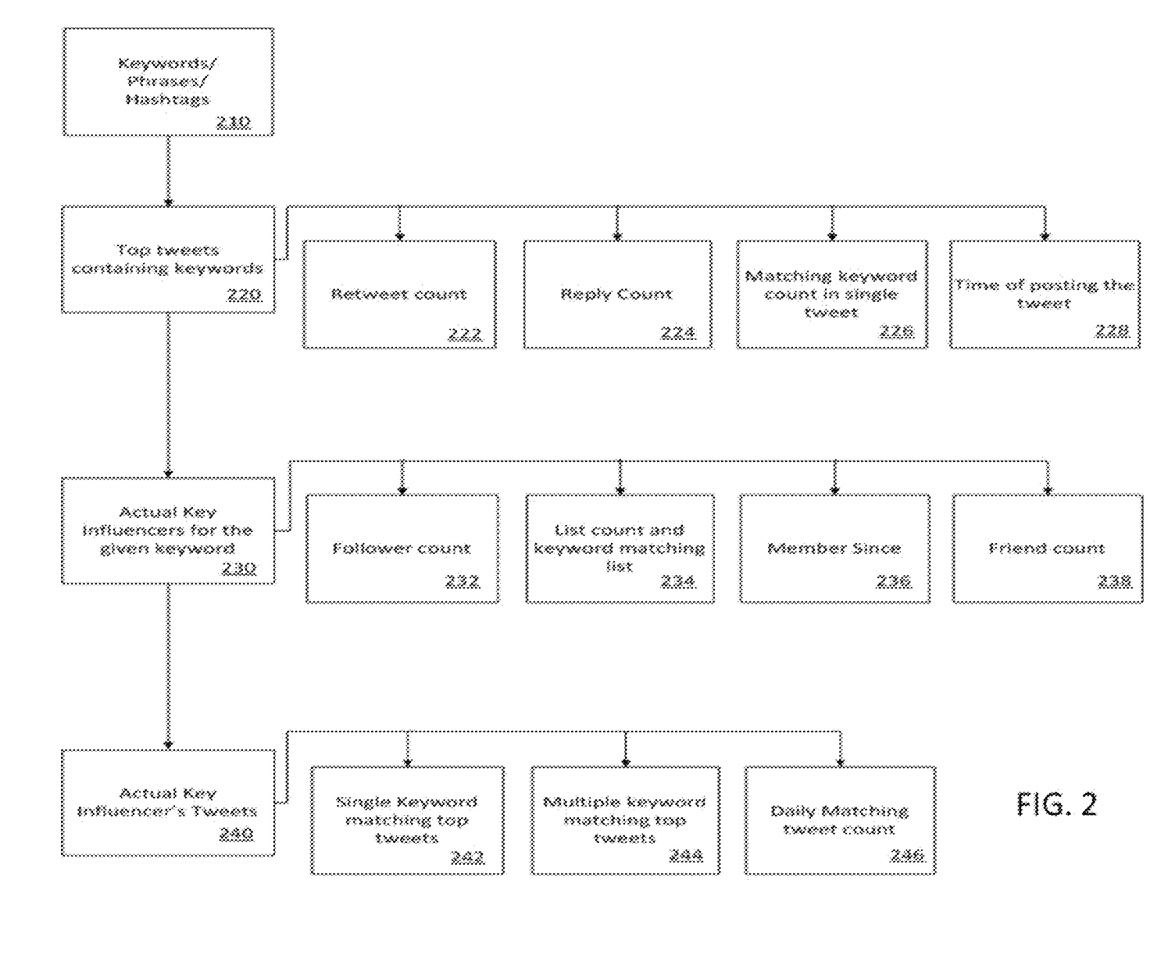
FIG. 2 is an illustrative example to explain the manner of determining a list of actual key influencers.

FIG. 2 depicts an illustrative example to explain the manner of determining a list of actual key influencers from a social network database (herein Twitter® has been taken as a reference social network database selected by the user).

For the purpose of illustration, if the user has given search keyword (210) as "iphone" and selected twitter as social network database, then all the tweets (220) containing "iphone" are fetched. A tweet in twitter refers to the content posted by the participants. These fetched tweets may be analyzed based on the one or more of the factors such as retweet count (222), reply count (224), matching keyword counting single tweet (226), time of posting the tweet (228), and the like. Retweet count herein refers to the count of a tweet of a participant that has been repeated by other participants. Reply count herein refers to the count of the replies correspond to a tweet. Matching keyword counting single tweet herein refers to the count of the keywords in a single tweet. Time of posting the tweet herein refers to the time at which the participant has posted the tweet. The participants of the analyzed tweets are the probable key influencers.

Every probable key influencer has metadata and activity information associated with him. Metadata of the probable key influencer may include, but not necessarily be limited to, professional details, age, likes/dislikes, hobbies, and the like. Activity information may include any activity the participant may perform on the social network, such as, frequency of tweeting, follower count (232), list count, count of keyword matching list (234), date of joining the social network (236), friends count (238), etc. The actual key influencers are determined based on the parameters like metadata and activity information associated with the probable key influencers (230). This activity information may identify the participant's area of interest and accordingly, actual key influencers are determined based on these parameters.

As an example and not by way of limitation, if a participant of Twitter has posted a tweet relating to a book on Roman Empire and the user is searching for the actual key influencers in the field of Roman history, the participant may be identified as a probable key influencer, though he will be categorized as an actual key influencer only if the parameters such as metadata or activity information of the participant points out that he has an interest in Roman history. For example, if the participant's professional details state him as a professor of history in one of the best colleges of the world, then he may be determined as an actual key influencer as user may be interested in the content he has posted for Roman history.

Particular embodiment may show the tweets of the actual key influencers based on one or more indications as illustrated in 240 of FIG. 2. The indications may include, but not limited to, single keyword matching top tweets (242), multiple keywords matching top tweets (244), daily matching tweet count (246), and the like. In one of the embodiment, user can give multiple keywords to search for in social network databases. In that case, multiple keywords matching top tweets refers to the tweets that mention the multiple keywords given by the user, for example, if the user has given cars, phones, houses as the search keywords, then the tweets mentioning all the three keywords may be shown in the result of the tweets of the key influencer.

Figure 3:
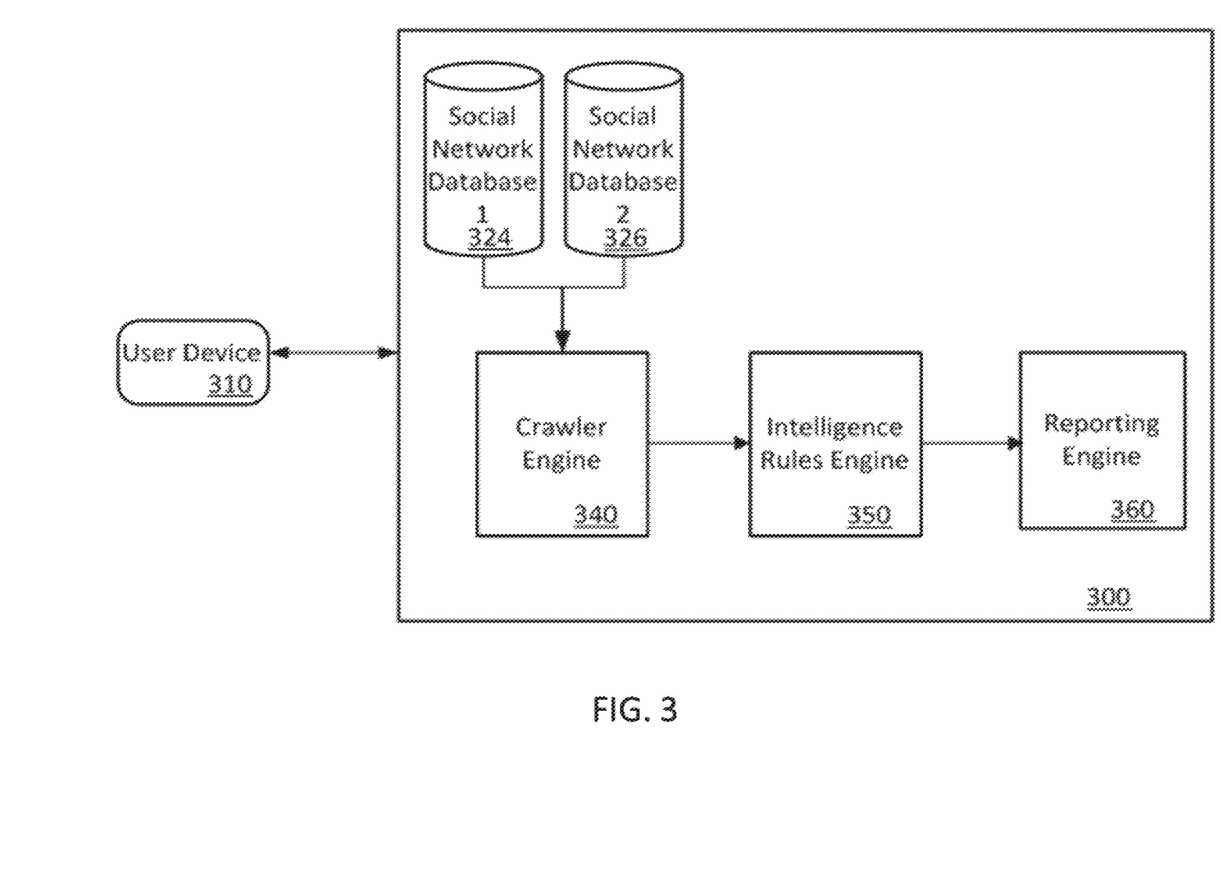
FIG. 3 is a block diagram illustrating the details of an example system monitoring and analyzing social network database to determine actual key influencer, in which several aspects of the present disclosure can be implemented.

FIG. 3 is a block diagram illustrating the details of an example system monitoring and analyzing social network database to determine actual key influencer, in which several aspects of the present disclosure can be implemented. System 300 includes, social network database 1 (324), social network database 2 (326), crawler module (340), intelligence rule module (350), reporting module (360).

User device 310 may enable the user to provide keyword(s) to be searched. Crawler module 340 may receive the keyword(s) given by the user and search for all the content having the keywords in it. The content herein contemplates to include but not limited to text, audio, video or combination of such content. The content may be stored in one or more of the social network database. Herein in system 300, content may be stored in social network database 1 (324) and social network database 2 (326). The content may be created, cited or presented by the participants of the social networks. The user may be enabled to select one or more social network database in which the user wants to search for the keywords. For example, the user in system 300 may select either social network database 1 or social network database 2 or both for determining actual key influencers.

Particular embodiment may enable the user to provide other inputs along with the keywords. These inputs may include, but not limited to, time, date, language, area, country of the post created/posted by the participants or combinations thereof. Accordingly, crawler module 340 may fetch the content from the selected social network databases (324, 326) based on the inputs and keywords given by the user. The fetched content is then analyzed in intelligence rule module 350 to identify probable key influencers. The probable key influencers are identified among the participants of the social networks. The probable key influencers are identified correspond to the content analyzed based on factors, such as, for example, liking of the content by other participants, number of replies against the published content, time of content publication, and the like. Once the probable key influencers are identified, actual key influencers are determined based on the metadata and activity information of the probable key influencer. Intelligence rule module 350 send the key influencers details and the corresponding relevant content to reporting module 360 for generating the report that may be of assistance to the user for decision making. In one embodiment, the reports generated by report module 360 may be based on the metadata the actual key influencer selected by the user. For example, report may show the actual key influencer with their profession and the content they published in last ten days. In one embodiment, report module 360 may receive some inputs from the users to generate the report based on the user's input. For example, the user may provide inputs like actual key influencers name, profession, friends count, account created date, published content. According the report may have all the fields corresponding to the user inputs. The manner of determining the actual key influencers in a social network database using different components of system 300 is described in an illustrative example below.

Figure 4:
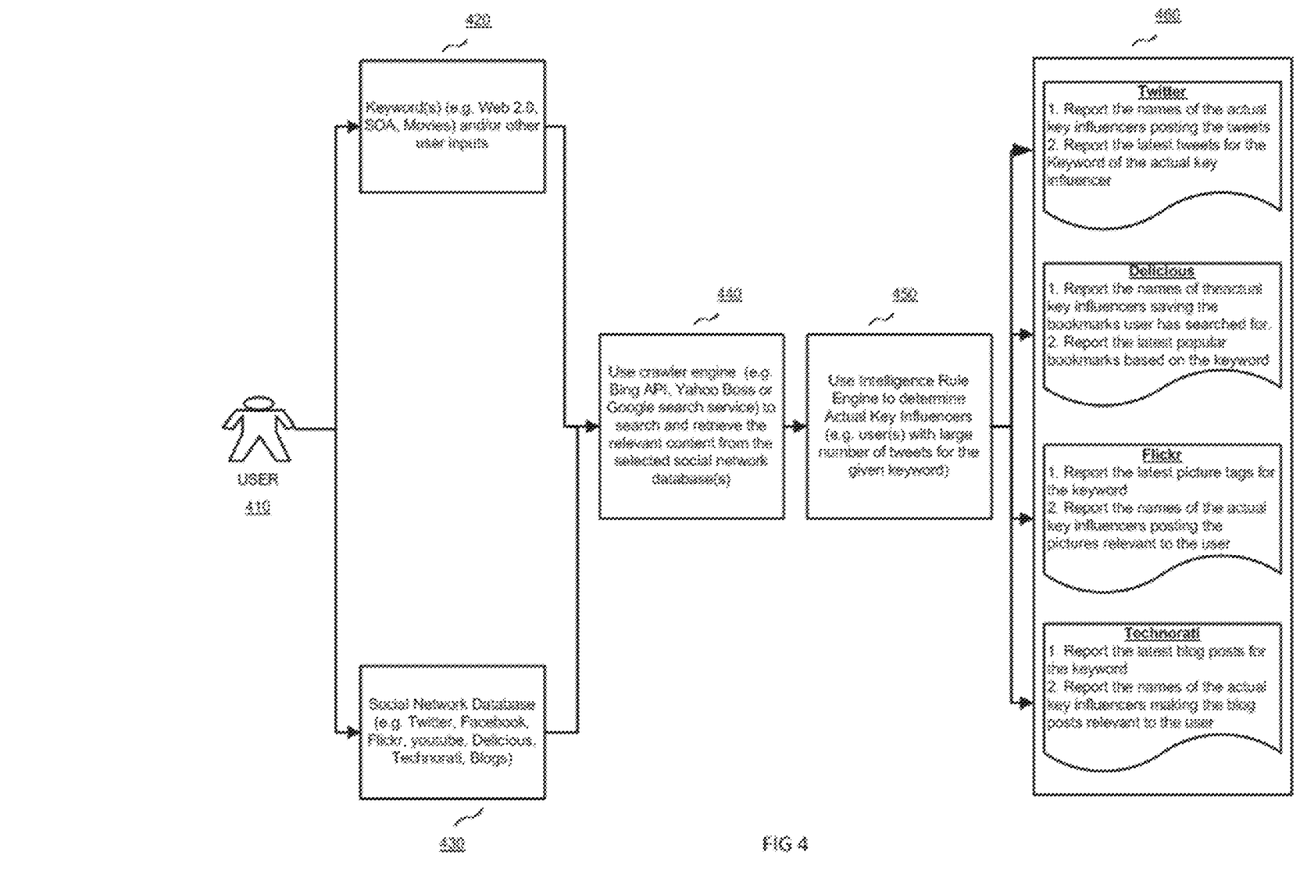
FIG. 4 illustrates the manner of monitoring and analyzing social network databases.

FIG. 4 illustrates an example of the manner of monitoring and analyzing social network databases to determine actual key influencers using different components of system 300. User 410 may be a person/organization who is interested to mine the actual key influencers in a particular field and may make the decision based on the content published by the actual key influencers. User 410 may provide keyword(s)/key phrase(s) of his interest and may also provide other inputs like the date of content publication, country, area, language etc as illustrated in 420. As an illustrative example and not as a limitation, user 410 may provide keywords as web 2.0 and SOA and restrict the search to the content published after year 2010. User 410 may select social network databases among the available social network databases, for example, he may select Twitter® and blogs as a selected social network database as illustrated in 430. Crawler module 340 herein retrieves content from the selected social network databases bases on the keywords and user inputs as illustrated in 440. In this illustration, crawler module would search Twitter® and blogs databases and retrieves the content published after year 2010 and has the keywords "web 2.0" and SOA. This relevant retrieved content may be used by the intelligence rule module 350 to determine actual key influencer.

Intelligence rule module 350 analyses the retrieved content and extract the content which may be of high interest to the user as illustrated in 450. This analysis may be based on number of factors like, but not limited to, number of comments the content has, frequently viewed content, number of times content has been referred by other participants etc. The participants of the analyzed content are the probable key influencers. Further these probable key influencers are evaluated based on parameters like, but not limited to, metadata and activity information of the probable key influencers stored in the social network database to determine actual key influencer. In one embodiment, these parameters may be given different weights to determine actual key influencer. For example, if a probable key influencer has 10 followers and another probable key influencer has 1000 followers then the weight assigned to the first probable key influencer may be one and to the second probable key influencer may be three. Weighing second probable key influencer more that the first key influencer shows that content published by the second one can be viewed by his 1000 followers and hence, the person is likely to have more influence that the person having 10 followers.

After the actual key influencers are determined, report module 360 may generate a report for every selected database as illustrated in 460. The report may contain the actual key influencer, his profile on the social network and the relevant content has posted on the social network. For example, if user 410 search for fish and prawn in a social network database related to food. The report may contain the name of the participant who has written/cited/presented any content relating to fish and prawn and also the relevant content.

Figure 5:
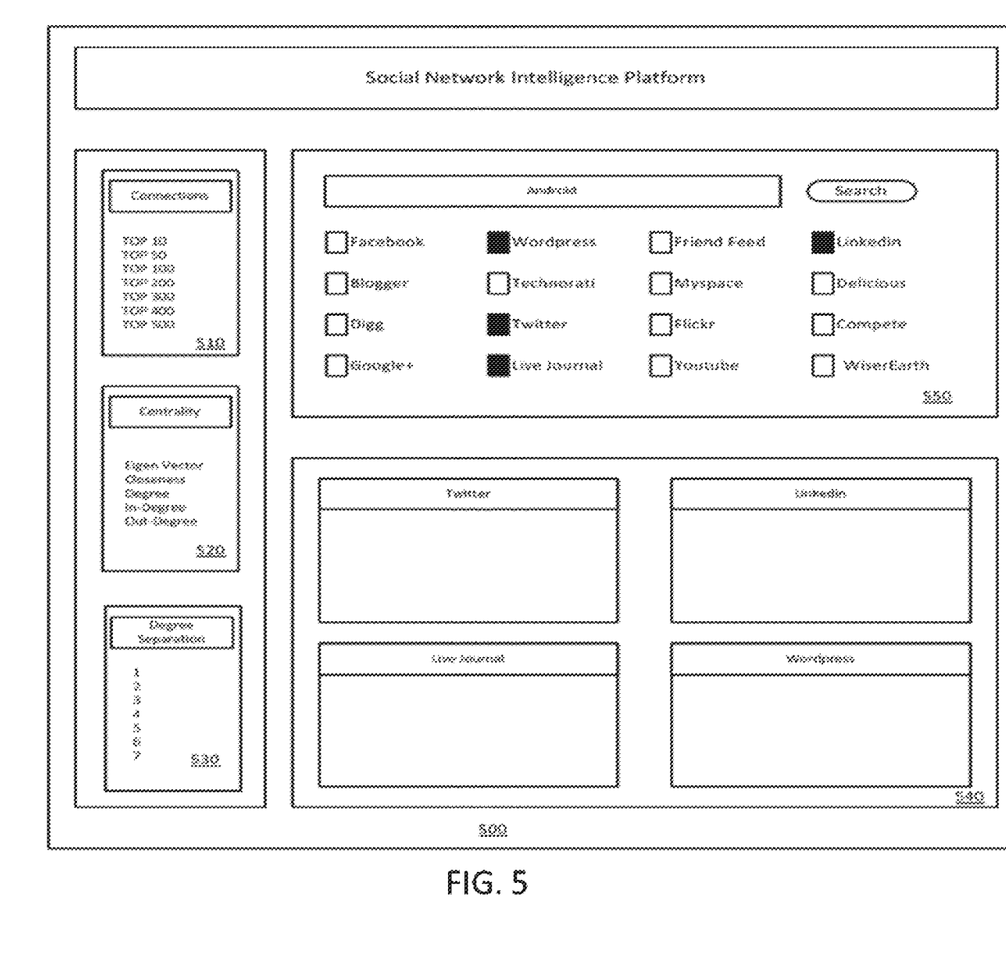
FIG. 5 is an example embodiment of a user interface according to an aspect of the present disclosure.

FIG. 5 is an example embodiment of a user interface 500 according to an aspect of the present disclosure. The data receiving module 500 shows a template for the user to provide the keywords and other inputs. Block 550 shows a list of social network databases. User may select one or more from the list of the social network databases. Block 510 provides the user with an option to set the output to a specific number of top connections. Block 520 provides the user with an option to set the output to specific network centrality measures. Block 530 provides the user with an option to set the output to specific degrees of separation.

Block 540 may display the output of the search for the selected social network databases. Block 540 contains smaller blocks for every selected social network database. As illustrated, a block for twitter will display a list of actual key influencers and the relevant content posted by them. When the user will select the block related to a particular social network database say, for example Twitter®, the template that may open in the data receiving is described below.

Figure 6:
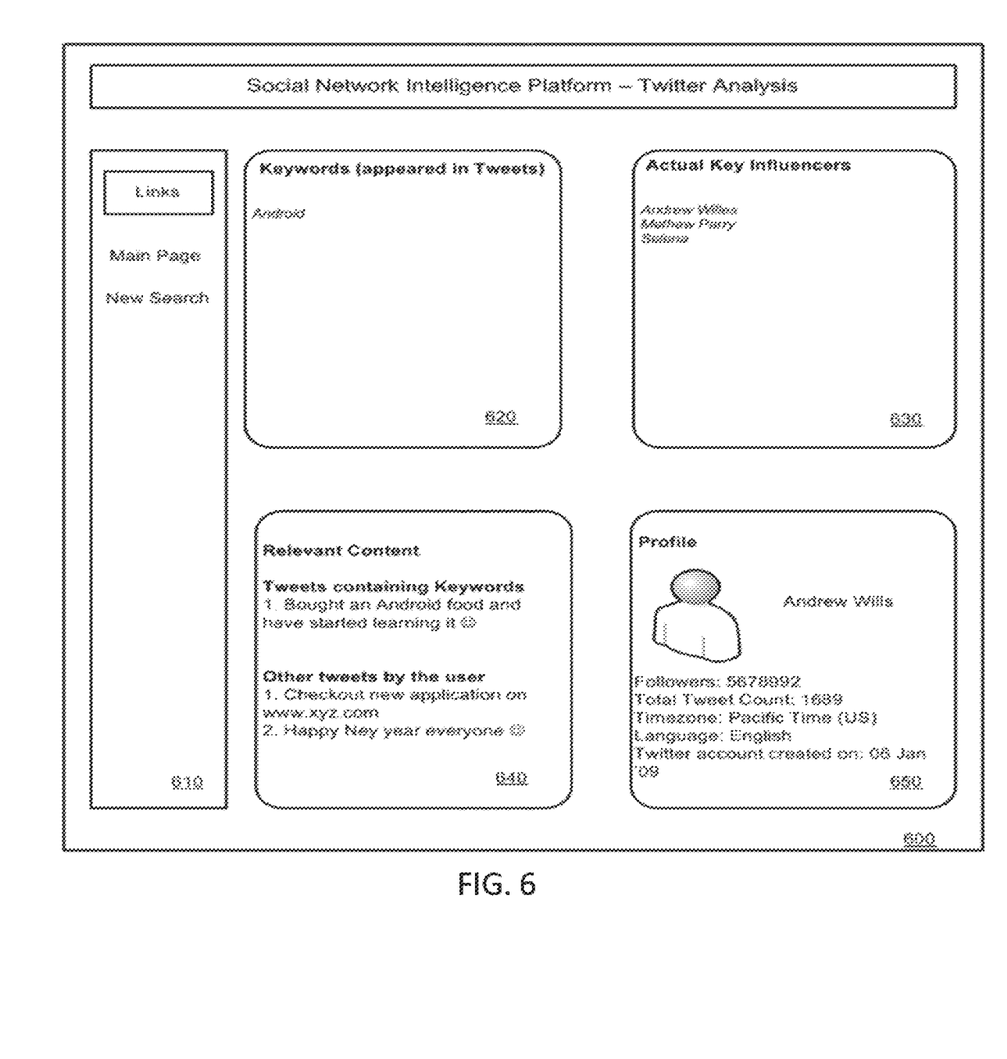
FIG. 6 is another example embodiment of a user interface according to an aspect of the present disclosure.

FIG. 6 is another example embodiment of a user interface 600 according to an aspect of the present disclosure. User interface 600 is shown which include, links block 610, keyword block 620, actual key influencer block 630, relevant content block 640 and profile block 650. As known in the art, the user interface may have one or more of the other blocks such as user cloud or details of keyword weight along with one or more of the blocks stated above.

Links block 610 may cite the relevant links to the user for easy navigation. Keyword block 620 may state all the keywords the user has searched for. Particular embodiment may also state other inputs given by the users in this block. When the user selects one of the keywords stated in keyword block 620, actual key influencer block 630 may specify the actual key influencers for the selected keywords and relevant content block 640 may specify the content related to the selected keyword by the actual key influencers. To check the profile of any of the key influencers, the user has to select one of the key influencer from the list of the key influencers specified in the actual key influencer block 630. The profile of the selected actual key influencer may be displayed in the profile block 650. Although the present disclosure describes or illustrates a user interface in a particular arrangement, the particular disclosure contemplates any suitable user interface in any suitable arrangement.

Exemplary Computing Environment

Figure 7:
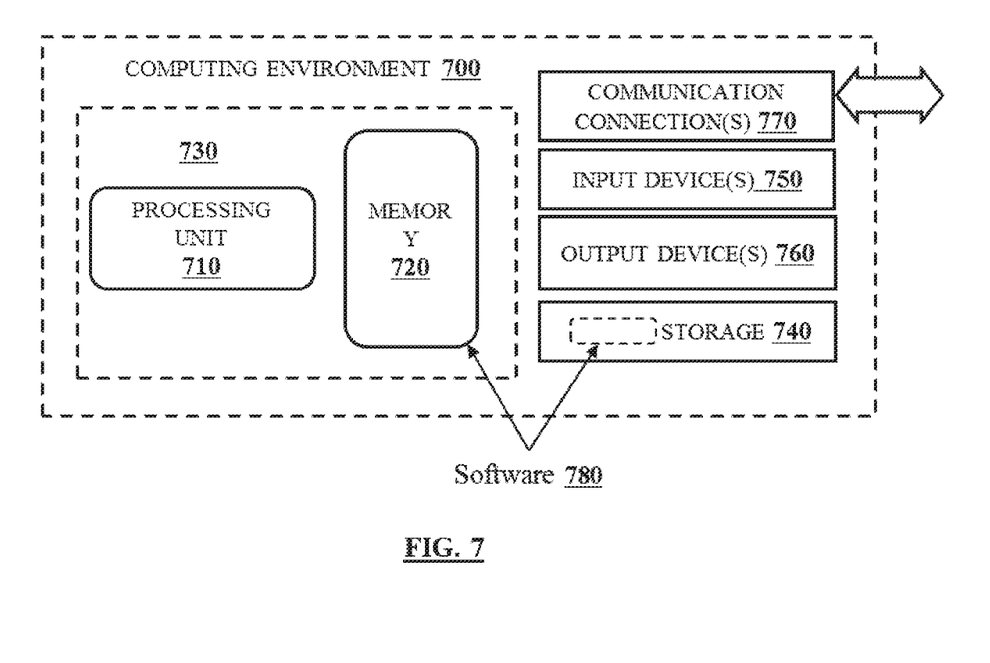
FIG. 7 is a system illustrating a generalized computer network arrangement, in one embodiment of the present technique.

One or more of the above-described techniques may be implemented in or involve one or more computer systems. FIG. 7 illustrates a generalized example of a computing environment 700. The computing environment 700 is not intended to suggest any limitation as to scope of use or functionality of described embodiments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. In some embodiments, the memory 720 stores software 780 implementing described techniques.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which may be used to store information and which may be accessed within the computing environment 700. In some embodiments, the storage 740 stores instructions for the software 780.

The input device(s) 750 may be a touch input device such as a keyboard, mouse, pen, trackball, touch screen, or game controller, a voice input device, a scanning device, a digital camera, or another device that provides input to the computing environment 700. The output device(s) 760 may be a display, printer, speaker, or another device that provides output from the computing environment 700.

The communication connection(s) 770 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 700, computer-readable media include memory 720, storage 740, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method for monitoring and analyzing information relating to a product in at least one database from a plurality of social network databases, the method comprising:
   receiving user inputs, wherein the user inputs comprise:
   at least one keyword, at least one language and at least one country; and
   at least two social network databases from a list of social network databases;

fetching content from the at least two social network databases based on the user inputs;
analyzing the fetched content from the at least two social network databases to identify a list of probable key influencers, each probable key influencer having a presence on each of the at least two social network databases, each probable key influencer being associated with a number of followers;
determining one or more actual key influencers i) by applying a weight to at least the number of followers associated with each probable key influencer such that a greater weight indicates an individual having more influence and ii) based on parameters including metadata and activity information associated with each probable key influencer, the metadata including professional experience and hobbies, the activity information including frequency of posting about a particular topic and date of joining a social network; and
generating reports on the one or more actual key influencers.

2. The method of claim 1, further comprising:
validating the user inputs.

3. The method of claim 1, wherein user inputs further comprises:
weight corresponding to the at least one search keyword.

4. The method of claim 3, further comprising:
determining the one or more actual key influencers based on the weight corresponding to the at least one search keyword.

5. The method of claim 1, further comprising:
performing semantic intelligence on the fetched content.

6. The method of claim 1, wherein the fetched content in a social network database comprises:
content created, cited and presented by a plurality of participants.

7. The method of claim 1, wherein the generated reports comprises one or more of:
a detailed report; and
a summary report.

8. The method of claim 7, wherein the detailed report provides a social network analysis metrics of the selected social network databases.

9. The method of claim 7, wherein the summary report provides a high level summary of the social network analysis metrics of the selected social network databases.

10. The method of claim 1, further comprises:
generating a social graph based on the fetched content across the selected social network database and the actual key influencers.

11. The method of claim 1, wherein the method is performed over one or more of:
a web hosting service; and
a cloud service.

12. A system for monitoring and analyzing information relating to a product in at least one database from a plurality of social network databases, the system comprising:
a data receiving module configured to receive user inputs, wherein the user inputs comprises:
at least one keyword, and at least one of a language and a country; and
at least two social network databases from a list of social network databases;
a crawler module configured to fetch content from the at least two social network databases based on the user inputs;
an intelligence rules module configured to analyze the fetched content from the at least two social network databases to identify a list of probable key influencers, each probable key influencer having a presence on each of the at least two social network databases, the analysis being based on number of repostings of a content, number of replies and time of posting;
the intelligence rules module further configured to determine one or more actual key influencers based on parameters including metadata and activity information associated with each probable key influencer, the metadata including professional experience and hobbies, the activity information including frequency of posting about a particular topic, number of followers and date of joining a social network;
a reporting module configured to generate reports on the one or more actual key influencers; and
a plurality of hardware processors for implementing the modules.

13. The system of claim 12, further comprising:
a validation module configured to validate the user inputs.

14. The system of claim 12, wherein the intelligence rules module is further configured to perform semantic intelligence on the fetched content.

15. The system of claim 12, wherein the data receiving module is further configured to enable a user to select at least one social network database from a plurality of social network databases.

16. The system of claim 12, wherein user inputs further comprises:
weight corresponding to the at least one search keyword.

17. The system of claim 16, wherein the intelligence rules module is further configured to determine the one or more key influencers based on the weight corresponding to the at least one search keyword.

18. The system of claim 12, wherein content in a social network database comprises:
content created, cited and presented by a plurality of participants.

19. The system of claim 12, wherein the reporting module is configured to generate reports comprises one or more of:
a detailed report; and
a summary report.

20. The system of claim 19, wherein the detailed report provides a social network analysis metrics of the selected social network databases.

21. The system of claim 19, wherein the summary report provides a high level summary of the social network analysis metrics of the selected social network databases.

22. The system of claim 12, wherein the reporting module further configured to generate a social graph based on the fetched content across the selected social network database.

23. The system of claim 12, wherein the system is deployed over one or more of:
a web hosting service; and
a cloud service.

24. A computer program product comprising a non-transitory computer readable medium having a computer readable code embodied therein for monitoring and analyzing at least one social network database from a plurality of social network databases, the product comprising:
program code adapted for receiving user inputs, wherein the user inputs comprises: at least one social networking database from a list of social networking databases and at least one search keyword, time, date, language, area and country;
program code adapted for fetching content from the at least one social network database based on the user inputs;

program code adapted for analyzing the fetched content from the at least one social network database to identify a first key influencer, the analysis being based on number of repostings of a content, number of replies and time of posting, wherein the first key influencer is a list of probable key influencers;

program code adapted for determining a second key influencer based on parameters including metadata and activity information associated with the first key influencer, the metadata including professional experience and hobbies, the activity information including frequency of posting about a particular topic, number of followers and date of joining a social network, wherein the second key influencer is a list of actual key influencers; and program code adapted for generating reports on the second key influencer.

25. The product of claim 24, further comprising program code adapted for validating the user inputs.

26. The product of claim 24, wherein user inputs further comprises:

weight corresponding to the at least one search keyword.

27. The product of claim 26, further comprising program code adapted for determining the second key influencer based on the weight corresponding to the at least one search keyword.

28. The product of claim 24, further comprising program code adapted for performing semantic intelligence on the fetched content.

29. The product of claim 24, wherein content in a social network database comprises:

content created, cited and presented by a plurality of participants.

30. The product of claim 24, wherein the generated reports comprises one or more of:

a detailed report; and a summary report.

31. The product of claim 30, wherein the detailed report provides a social network analysis metrics of the selected social network databases.

32. The product of claim 30, wherein the summary report provides a high level summary of the social network analysis metrics of the selected social network databases.

33. The product of claim 24, further comprising program code adapted for generating a social graph based on the fetched content across the selected social network database and the second key influencers.

* * * * *